Nov. 3, 1959  R. J. SETTZO  2,910,862
LINEAR BODY GAUGING
Filed July 6, 1955  4 Sheets-Sheet 1

INVENTOR.
ROBERT J. SETTZO
BY Clarence R. Patty, Jr.
ATTORNEY

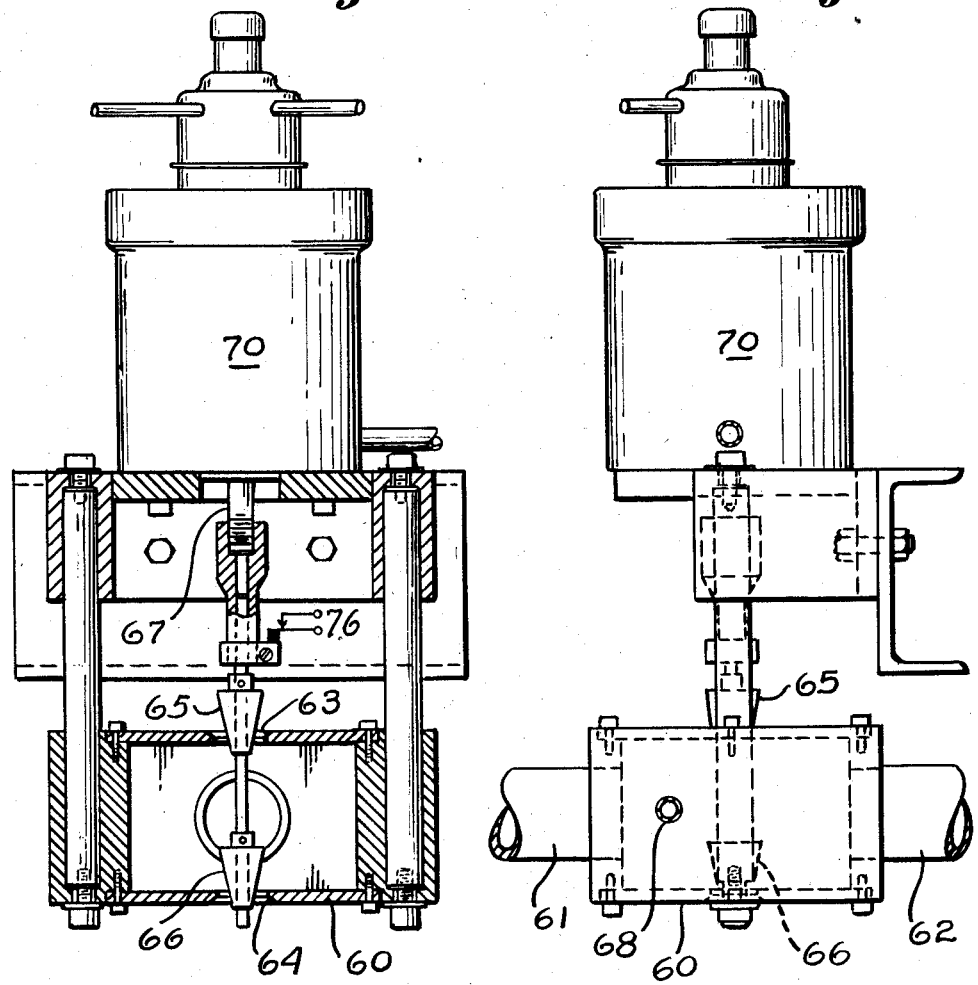

Nov. 3, 1959 R. J. SETTZO 2,910,862
LINEAR BODY GAUGING
Filed July 6, 1955 4 Sheets-Sheet 3

INVENTOR.
ROBERT J. SETTZO
BY Clarence R. Patty, Jr.
ATTORNEY

Nov. 3, 1959

R. J. SETTZO 2,910,862

LINEAR BODY GAUGING

Filed July 6, 1955

INVENTOR.
ROBERT J. SETTZO
BY Clarence R. Patty, Jr.
ATTORNEY

United States Patent Office 2,910,862
Patented Nov. 3, 1959

2,910,862

LINEAR BODY GAUGING

Robert J. Settzo, Corning, N.Y., assignor to Corning Glass Works, Corning, N.Y., a corporation of New York Application July 6, 1955, Serial No. 520,299

9 Claims. (Cl. 73—37.7)

The present invention relates to the continuous production of linear bodies of thermoplastic material, such as tubing and cane, and is primarily concerned with the control of production facilities in a manner to attain greater cross-sectional dimension uniformity of such bodies.

Facilities for mechanically gauging linear bodies in the course of their continuous production are known, but are objectionable, especially when the rate of production is high, due to excessive wear of the contacting and associated mechanically actuated parts.

Non-contacting systems embodying precision air gauges have also been developed for use in the measurement of linear bodies. Such systems, however, have had their instrumentation operable in accordance with changes in pressure resulting from variation in leakage of air from a chamber passage having at most only a few thousandths of an inch clearance about the body passing therethrough. Although such a system is satisfactory for use in measuring bodies whose dimension varies only slightly, such for example as in metal wire drawing or the like, it fails to meet the needs for gauging thermoplastic bodies, since their dimensions are usually larger and their size variations cover a much wider range.

The problem of gauging such bodies, glass tubing for example, is made much more complex owing to the fact that additional clearance must be allowed for some lateral motion that cannot be prevented in the drawing of glass bodies. Furthermore allowance must be made for acceptable variations in shape, i.e., round bodies sometimes tend to run slightly oval. With the large clearances necessary under the above circumstances the air pressure must be held very low to keep the volume of air flow within reasonable or practicable limitations. These conditions make the suitable regulation of air pressure for all practical purposes impossible and prevent any accurate indication being made of the cross-sectional dimension of such a body by measurement of air flow. From the foregoing it will be appreciated that a non-contacting system employing air pressures must be of such a character as to be insensitive to variation in the supplied air pressure within the operating limits of the system.

According to the invention, these requirements are met by means of a pneumatic arrangement having characteristics paralleling those in an electrical control system embodying a Wheatstone bridge. In such a pneumatic arrangement two of the bridge arms comprise orifice plates which serve as fixed resistances and the other two arms of the bridge embody the air gauge and an automatically positioned balance valve, respectively. By so operating the balance valve that it always tends to maintain zero pressure differential across the bridge, pressure applied to maintain the zero pressure is in exact accordance with the dimensional characteristic of the linear section of the body at the moment occupying the gauge. In practice any unbalance in pressure in the bridge is instantly detected through the medium of a differential pressure transmitter which, through a controller and a valve positioner, causes the balance valve to be rapidly operated in a direction to rebalance the bridge.

Since the air pressure applied to the positioner is indicative of the size of the linear body, or product occupying the gauge, it is utilized not only to reposition the valve, but also to operate an indicating or recording device calibrated in product size. Preferably the cross-sectional dimension of the linear body is recorded on a traveling chart from which an operator can readily determine at a glance any action that may be necessary to maintain production of the product within the desired size range.

Calibration for a given range of product is accomplished by inserting fixed orifice plates of a proper size, and by mounting upon the gauge and balance valve, measuring orifice plates of a size to cover the particular range. Measuring sensitivity is determined by the taper of the movable plugs inserted in the balance valve. For best operation, it is preferable to employ the balance valve with its apertures matched to those of the gauge so that air flow through the two units is identical.

A calibration for each range is established by inserting sections of tubing of known diameter into the gauge, thus establishing a relationship between tubing diameter and controller output pressure. Orifice sizes are so chosen that this relationship remains linear throughout the entire range.

In operation of the system, tubing occupies the gauge passage, and the system will continuously maintain a pressure balance between the gauge chamber and the balance valve chamber, so that pressure transmitter output is maintained at 9 p.s.i.

The controller, supplied with 20 p.s.i. air, is adjusted so that its output pressure will continuously change as long as the differential pressure transmitter output deviates from its zero position or 9 p.s.i. Thus, if transmitter pressure is low, the controller output pressure continually decreases until a balance is achieved whereby the transmitter pressure again returns to 9 p.s.i. This new controller output pressure will be maintained until the system is again unbalanced by a diameter change. Positioning of the balance valve is accomplished from the controller output pressure by operating the pneumatic valve positioner or power unit with this pressure.

In the system as hereinafter illustrated and described the differential pressure transmitter, also supplied with air at an input pressure of 20 p.s.i., has output pressure covering a range of 3–15 p.s.i. with a pressure output of 9 p.s.i. when gauge pressure and balance valve pressure are equal. Such differential transmitter may be of any suitable commercially available type. One suitable type is illustrated and described in bulletins distributed by Republic Flow Meters Co., Chicago, Illinois, U.S.A.

Operation of the balance valve as required to maintain the bridge balanced is conveniently effected by a suitable power unit. Any accurate pneumatic positioner having a 1½" stroke is satisfactory for this purpose. One suitable type of unit is fully illustrated and described in a circular distributed by Conoflow Corp., 2100 Arch Street, Philadelphia 3, Pennsylvania, U.S.A.

The variable pressure output of the differential transmitter is fed to a controller which receives air pressures representing transmitter output and the set point. In accordance with variations in transmitter output, it instantly varies the output from a constant supply air pressure of 20 p.s.i. through a 3–15 p.s.i. range. The resulting controlled air pressure instantly modifies the position of the final control element, namely the balance valve, as necessary to maintain the air bridge balanced, while a branch of the line extending to the balance valve positioner, or fluid power unit, maintains the recording pen of a suitable recording unit in a position indicative of the size of product that is at the moment occupying the gauge. Any controller possessing proportional and integral response may be used, such for example as the Air-O-Line type, shown and described in catalog 2221, distributed by Minneapolis-Honeywell Regulator Co., Philadelphia 44, Pennsylvania, U.S.A., or the Tel-O-Set adjustable band type, shown and described in an "Instruction Manual" distributed by such company.

To prevent possible gauge damage or product breakage by engagement of the gauge by stones or bumps on a defective section of the product and to prevent erratic operation of the recording equipment under such circumstances a gauge protector, or a stone gate, is provided to automatically open the gauge before a body section of such character can encounter it.

For a better understanding of the invention reference is had to the accompanying drawings in which:

Fig. 3 is a front elevation, partly in section, of a balancing valve embodying the invention and of its associated positioner or power unit.

Fig. 4 is a side elevation of the equipment of Fig. 3.

Fig. 8 is a diagrammatic piping diagram of the entire gauging system.

Fig. 9 is an electric circuit diagram of the system including a diagrammatic illustration of a tubing source and tubing issuing therefrom through the gate and gauge.

Tubing issuing from a suitable supply source, such as a continuous tube drawing machine, while on its way to a delivery position passes through the stone gate and thence through the gauge. If there is any form of protuberance on the tube wall that might be detrimental to or cause abortive operation of the gauge, the stone gate is tripped open and effects the opening of the gauge for a time sufficient to allow the defective portion of the tube to pass beyond it. The gauge and gate are then reclosed. The tubing in passing through the gauge causes the differential pressure transmitter to adjust the pneumatic controller in a manner to maintain the balance valve positioned in accordance with the tubing size and the tape recorder needle in a position, relative to a printed standard size-designating line on the tape, in accordance with the size variation of the tubing with respect thereto.

Figure 1:
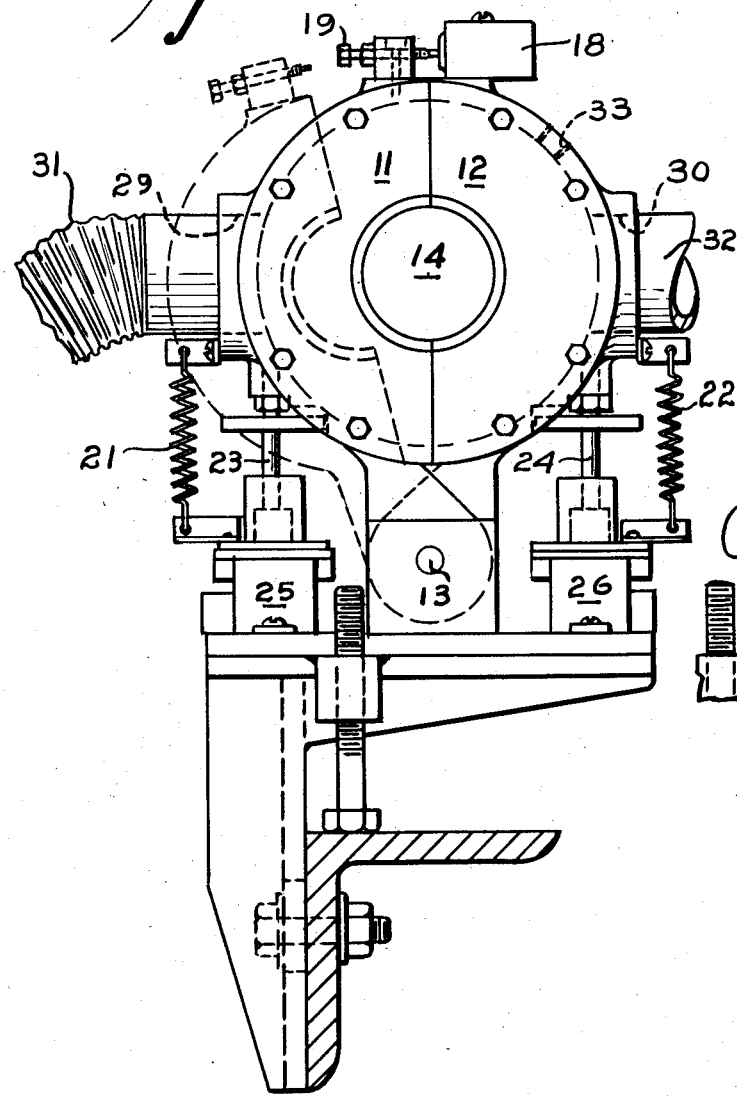
Fig. 1 shows, in front elevation, a tube gauge embodying the invention shown associated with a horizontal tube drawing runway shown in transverse cross section.
Figure 2:
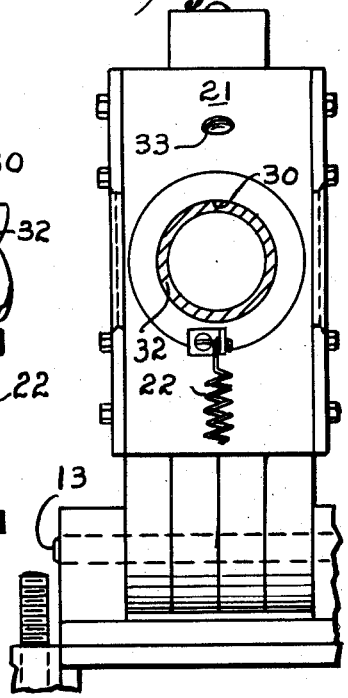
Fig. 2 is a side elevation of the gauge of Fig. 1 and of part of its support.

Referring now to Fig. 1, the tube gauge shown comprises a generally circular housing having two laterally separable halves 11 and 12 pivoted about a pin 13 and having a tube passage 14 therethrough. The housing half 12, in the region opposite pin 13, has a pad on which is mounted an electric switch 18 adapted to be normally held closed by a cap screw 19 similarly supported on the housing half 11. The halves 11 and 12 are adapted to be normally held in the closed position against the tension of springs 21 and 22 by piston rods 23 and 24 of their respective actuating air cylinders 25 and 26 which are normally supplied with air from a suitable source via a normally energized magnetic valve 27 (Fig. 9). The gauge halves 11 and 12 are also provided with air inlet passages 29 and 30 respectively to which flexible air supply hoses 31 and 32 are connected. In addition an outlet passage 33 is provided for connection to a differential pressure transmitter.

Figure 5:
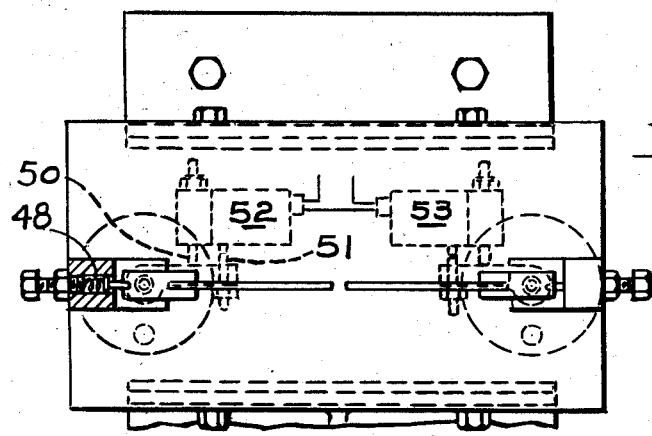
Fig. 5 is a top plan view of a stone gate embodying the invention.
Figure 6:
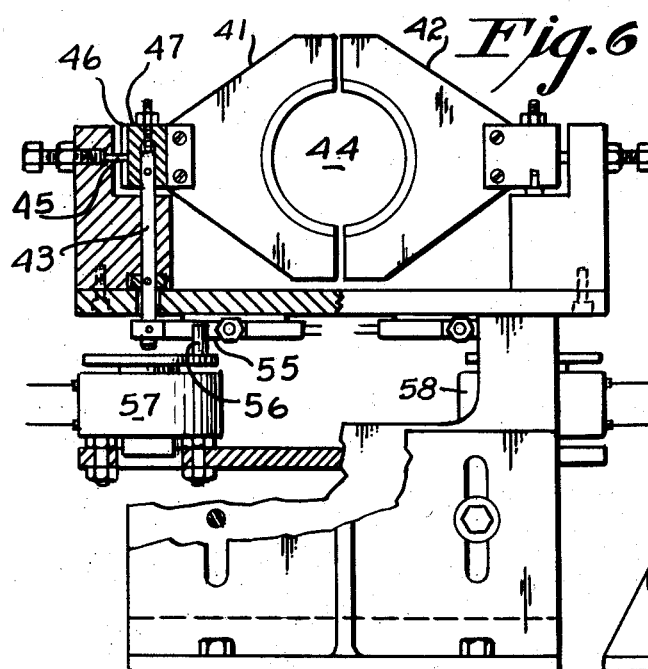
Fig. 6 shows a front elevation of the stone gate, partly in section.
Figure 7:
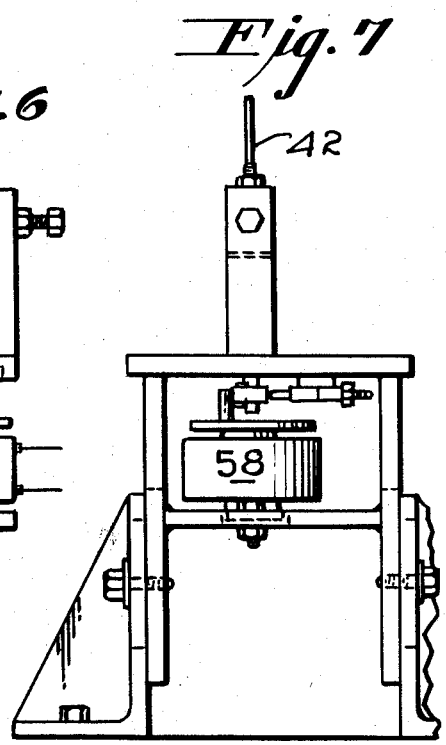
Fig. 7 shows a side elevation of the stone gate.

Referring now to Figs. 5, 6, and 7, the stone gate embodies two halves 41 and 42 each pivoted on a vertical pin, such as 43, and jointly providing a tube passage 44. The gate half 41 is normally resiliently held in the closed position by a pin 45 occupying a groove 46 in a gate supporting block 47 under a partly compressed spring 48. Gate half 42 is normally held closed in a similar fashion.

With gate half 41 in the closed position block 47 engages a stop 50 and a pin 51 carried by the block operatively engages a suitably supported electric switch 52. Similar facilities are associated with gate half 42 with which is associated a switch 53. To move the gate half 41 to its closed position the lower end of hinge pin 43 is provided with an arm 55 adapted to be engaged by a crank 56 adapted to be rotated through a 90° arc to close the gate by a solenoid motor 57 when the motor is energized and to be restored to its normal position, indicated in Fig. 5, under tension of a spring of such motor when its solenoid is deenergized. Similar facilities including a motor 58 are associated with gate half 42. Motors of the foregoing type are shown and described in circulars distributed by G. H. Leland Inc., Dayton 2, Ohio.

Referring now to Figs. 3 and 4, the balance valve embodies a housing 60 having air inlet conduits 61 and 62 and outlet passages 63 and 64, respectively. The exhaust of air through passages 63 and 64 is under control of tapered plugs 65 and 66 supported by a piston rod 67 of a pneumatic positioner or power unit 70. In addition air outlet passage 68 is provided for connection to a differential pressure transmitter. A switch 76 associated with the balance valve is adapted to be closed only when the rod 67 is in its fully elevated position, as when the gauge is unoccupied or open.

Referring now to Fig. 8 it will be observed that the tube gauge and the balance valve housings are supplied with air from a blower 80 via orifice plates 81 and 82, and that such housings are in communication with a differential pressure transmitter. The differential transmitter in turn is in communication with a pneumatic controller utilizing proportional and integral response and which supplies air to a tape recorder and to the pneumatic positioner or power unit 70 at pressures in accordance with that supplied to it by the differential pressure transmitter in a manner well known.

Since the differential transmitter, the controller, the pneumatic balance valve positioner or operating unit and the recorder may be of commercial form and do not of themselves embody features of the invention their detailed description is believed unnecessary.

By referring to the diagram of Fig. 9 it will be observed that the operating circuit for the magnetic valve 27, which supplies air to the gauge closing cylinders 25 and 26, extends from an X terminal of a suitable current source, through the stone gate switches 52 and 53 in series, the winding of valve 27 to conductor 71 and thence via normally open contacts 77 of a timer T to a Y terminal of such current source. The contacts of the gauge switch 18 comprise an obvious locking circuit for the solenoid of valve 27 dependent of contacts 77. Motor M drives the recorder tape 83.

The timer operating circuit extends from an X terminal, through switches 52 and 53, timer T, and the balance valve switch 76 to a Y terminal.

The operating circuit for the stone gate motor solenoids extends from an X terminal, through solenoids of motors 57 and 58 in parallel, contacts of a slow acting relay 85, and through the balance valve switch 76 terminal. The operating circuit for relay 85 is similar to that traced through motor solenoids 57 and 58 except that it excludes its own contacts.

Normally, the gauge solenoid 27 is energized, since normally the stone gate switches 52 and 53 and the gauge switch 18, respectively, are closed. If the stone gate is tripped, switch 52 or 53 opens thus interrupting the circuit of the solenoid of valve 27 thus connecting cylinders 25 and 26 to atmosphere, thereby permitting springs 21 and 22 to open the gauge and its switch 18. When the gauge opens the drop in air pressure from it to the differential transmitter, of course, greatly unbalances the bridge and effects the movement of the balance valve plugs 65 and 66 to their wide open positions so that the balance valve switch 76 is closed. Switch 76, on closing, completes the operating circuit through slow acting relay 85 which in turn closes those of stone gate solenoids 57 and 58. Solenoids 57 and 58 then operate to restore the operated stone gate half 41 or 42 and the operated switch 52 or 53 to its closed position. When switches 52 and 53 are both again closed, since the balance valve switch 76 is now also closed, the operating circuit for timer T is completed. After expiration of the time required for the section of defective tubing that tripped the stone gate to pass the gauge the timer contacts 77 close and effect the reenergization of solenoid 27, unless the stone gate has been again opened in the meantime.

Solenoid 27 upon reenergization remains energized over its locking circuit. Obviously, if the stone gate is again tripped before the preceding defective tubing section passes through the open gauge, closure of the gauge will be further delayed until the stone gate has remained closed throughout the period required to pass a given section of the tube through both the stone gate and the gauge.

What is claimed is:

1. In a gauging system a gauge embodying a housing having a passage therethrough through which a linear body to be measured may be freely passed, a balance valve having a housing with a similar passage therethrough having associated members adjustable to afford varying degrees of obstruction to the passage of air therethrough in accordance with the obstruction afforded by a linear body to the flow of air through its passage, means for supplying a like uniform volume of air under pressure to said housings, means under the joint control of the pressures therein to maintain said members in positions dependent on the cross-sectional dimension of the body occupying the gauge passage and for indicating such dimension of the body, a gate divided into two separately hinged halves jointly provided with a passage therethrough for receipt of a linear body before its passage through the gauge passage and adapted to be tripped to an open position by a linear body having an external obstruction thereon, and means under the control of the tripped gate half for effecting separation of the gauge halves while the position of the body having the obstruction passes the gauge.

2. In a system for gauging the transverse dimension of a linear body of work as it passes a given point in its linear path of travel, a non-work-contact type of pneumatic gauge normally positioned in close proximity to the body along its path of travel and movable out of gauging relation therewith, a gauge protective device along a section of the path of travel of the body ahead of the gauge location, and means under the control of said gauge protective device for moving said gauge out of gauging relation with the body during such times that the outer dimension of the body exceeds a predetermined maximum value.

3. In a system for gauging the transverse dimension of a linear body along a path of travel linear thereof, a gauge closable about such body in spaced relation with respect thereto, means tending to displace said gauge from a closed position with respect to such body, means normally preventing said first means from functioning, a gauge protective device ahead of the location of the gauge having a passage through which said body passes in its path of travel and operable by a transverse section of the body too large for free passage through said gauge, and an operating circuit for said second means including a switch adapted to be opened by said gauge protective device.

4. In a system such as defined by claim 3, means for preventing closure of said gauge for a predetermined interval after it has been opened.

5. In a system for gauging a linear body of work as it passes along a predetermined point in its linear path of travel, a non-work-contact type of pneumatic gauge embodying an electrically operable device adapted when energized to hold the gauge in gauging relation with the body, a gauge protective device along the path of travel of the body adapted to be tripped by sections of the body that would not freely pass through the gauge, an operating circuit for said device including a switch normally held closed by said protective device, means for restoring said protective device to its initial position after the deenergization of said electrically operable device, and means for preventing the reenergization of said electrically operable device until sufficient time has elapsed for the defective section of the body to have passed beyond said gauge.

6. In a gauging system, a non-work-contact type of pneumatic gauge, an electrical device energizable to render the gauge operatively associated with a traveling body of work to be gauged, means for disassociating such gauge from association with the body when said device is deenergized, a gauge protector arranged along the path of travel of the body ahead of the gauge, a second electrical device energizable to adjust such protector to a position to be tripped when encountered by the body if outside a predetermined size, a circuit for said first electrical device including a switch opened by said protector when tripped, a timing device, a switch operated in response to the disassociation of the gauge from the body for effecting the energization of said timing device and said second electrical device, means also responsive to the closure of said switch to effect the subsequent deenergization of said second device following the repositioning of said protector to its initial position, means for thereafter holding the protector in its position to be tripped, and means under control of said timing device for reestablishing an energizing circuit for said first device after a predetermined time period.

7. In combination, a pneumatic gauge embodying a generally circular housing comprising two laterally separable halves each having an air inlet passage and the halves jointly in their non-separated positions being in common communication with a passage therethrough for work to be gauged, means normally tending to hold such halves in their non-separated positions, circuit control contacts operable by such halves upon their movement between non-separated and separated positions, means for indicating the cross sectional volume of work passing through such passage in accordance with the dimension of that portion of the passage not obstructed by the work and means for overcoming said first means to effect separation of such halves at such times that work of excessive cross section for gauging is approaching the gauge.

8. In combination, a non-work-contact type of pneumatic gauge suitable for use in progressively gauging the volume of cross sectional area of a linear body as it passes through a passage thereof out of contact therewith, a housing comprising a pair of complementary hinged gauge halves which when closed jointly provide a tubular passage for such a body, means to so close such halves, other means tending to overcome the effect of such first means and thus move such halves to an open position to afford clearance for the free passage of a body of materially excessive cross sectional area therethrough, and means for disabling said first means to enable said other means to function.

9. In a system for gauging the transverse dimension of a linear body as it passes a given point in its linear path of travel, a non-work-contact type of pneumatic gauge normally in closely spaced proximity of the path of travel of such body and movable further from such path, a gauge protective device ahead of said gauge in similarly spaced proximity of such path and movable further from such path by areas of such body whose outer dimensions exceed a predetermined value, means under the control of said gauge protective device as it so moves for moving said gauge further from such path during such times that the excessive dimension portion of the body passes such given point, means under control of the gauge protective device for effecting restoration of the gauge to its initial position only after sufficient time has elapsed for the excessive dimension portion of the body to have passed such given point, and means under the control of said gauge to effect restoration of the gauge protective device.

References Cited in the file of this patent

UNITED STATES PATENTS

| | | |
|---|---|---|
| 2,077,525 | Mennesson | Apr. 20, 1937 |
| 2,399,113 | Guenther | Apr. 23, 1946 |
| 2,402,293 | Nye | June 18, 1946 |
| 2,516,932 | Wainwright | Aug. 1, 1950 |
| 2,564,527 | Fortier | Aug. 14, 1951 |
| 2,605,535 | Anderson | Aug. 5, 1952 |
| 2,636,951 | Fahringer | Apr. 28, 1953 |
| 2,637,115 | Watson | May 5, 1953 |
| 2,659,182 | Argyle | Nov. 17, 1953 |
| 2,794,258 | Danielson | June 4, 1957 |